MODULAR UNIT FOR MAKING PLUG-IN ELECTRICAL CONNECTIONS

Filed Feb. 29, 1968 4 Sheets-Sheet 1

INVENTORS
HOWARD V. MALMSTADT
CHRISTIE G. ENKE by: Wolfe, Hubbard, Voit & Osann
ATTYS.

MODULAR UNIT FOR MAKING PLUG-IN ELECTRICAL CONNECTIONS

Filed Feb. 29, 1968 4 Sheets-Sheet 2

INVENTORS
HOWARD V. MALMSTADT
CHRISTIE G. ENKE
by: Wolfe, Hubbard, Voit & Osann
ATTYS.

INVENTORS
HOWARD V. MALMSTADT
CHRISTIE G. ENKE by: Wolfe, Hubbard, Voit & Osann
ATTYS.

MODULAR UNIT FOR MAKING PLUG-IN ELECTRICAL CONNECTIONS

Filed Feb. 29, 1968 4 Sheets-Sheet 4

INVENTORS
HOWARD V. MALMSTADT
CHRISTIE G. ENKE
by: Wolfe, Hubbard, Voit & Osann
ATTYS.

United States Patent Office 3,524,198

Patented Aug. 11, 1970

3,524,198

MODULAR UNIT FOR MAKING PLUG-IN ELECTRICAL CONNECTIONS

Howard V. Malmstadt, Urbana, Ill., and Christie G. Enke, Lansing, Mich., assignors to Heath Company, St. Joseph, Mich., a corporation of Delaware Filed Feb. 29, 1968, Ser. No. 709,277

Int. Cl. H05k *1/04*

U.S. Cl. 317—101 8 Claims

ABSTRACT OF THE DISCLOSURE

A modular unit for making electrical connections with ordinary electrical wire without the use of special jacks, pins or the like, and useful in devices for teaching electronics. The modular unit includes a card member having a printed circuit or other circuit elements thereon, and a multiplicity of receptacles adapted to receive and hold the stripped end of ordinary electrical wire. A three-piece casing is secured to the card and forms a multiplicity of apertures associated with the receptacles on the card for receiving and guiding electrical wires into the receptacles. The top or header section of the casing is adapted to be mounted directly on the card, and thus may be used without the other two sections of the casing. Appropriate indicia are preferably provided on the casing for identifying the various receptacles associated with the apertures in the casing.

The present invention relates generally to electrical interconnection systems and, more particularly, to improved modular units for making plug-in or patch-type electrical connections.

It is a primary object of the present invention to provide an improved modular unit for making patch-type electrical connections by the use of ordinary electrical hook-up wire, i.e., without the use of any special jacks, connector pins, posts or the like. A related object of the invention is to provide such an improved modular unit which permits significant cost reductions in both the material and labor required to produce the same.

Another important object of this invention is to provide an improved modular unit of the type described above which permits an extremely high density of electrical connections, with corresponding reductions in the overall size of the modular system.

It is a further object of the present invention to provide an improved modular unit of the foregoing type which can be used to provide connections to both active and passive electrical components as well as printed circuits, integrated circuits and the like.

Other objects and advantages of the invention will become apparent upon reading the following detailed description and upon reference to the accompanying drawings, in which.

While the invention will be described in connection with certain preferred embodiments, it is to be understood that the invention is not limited to the particular embodiments disclosed, but, on the contrary it is intended to cover all the various modifications and equivalent arrangements included within the spirit and scope of the appended claims.

Figures 1, 2:
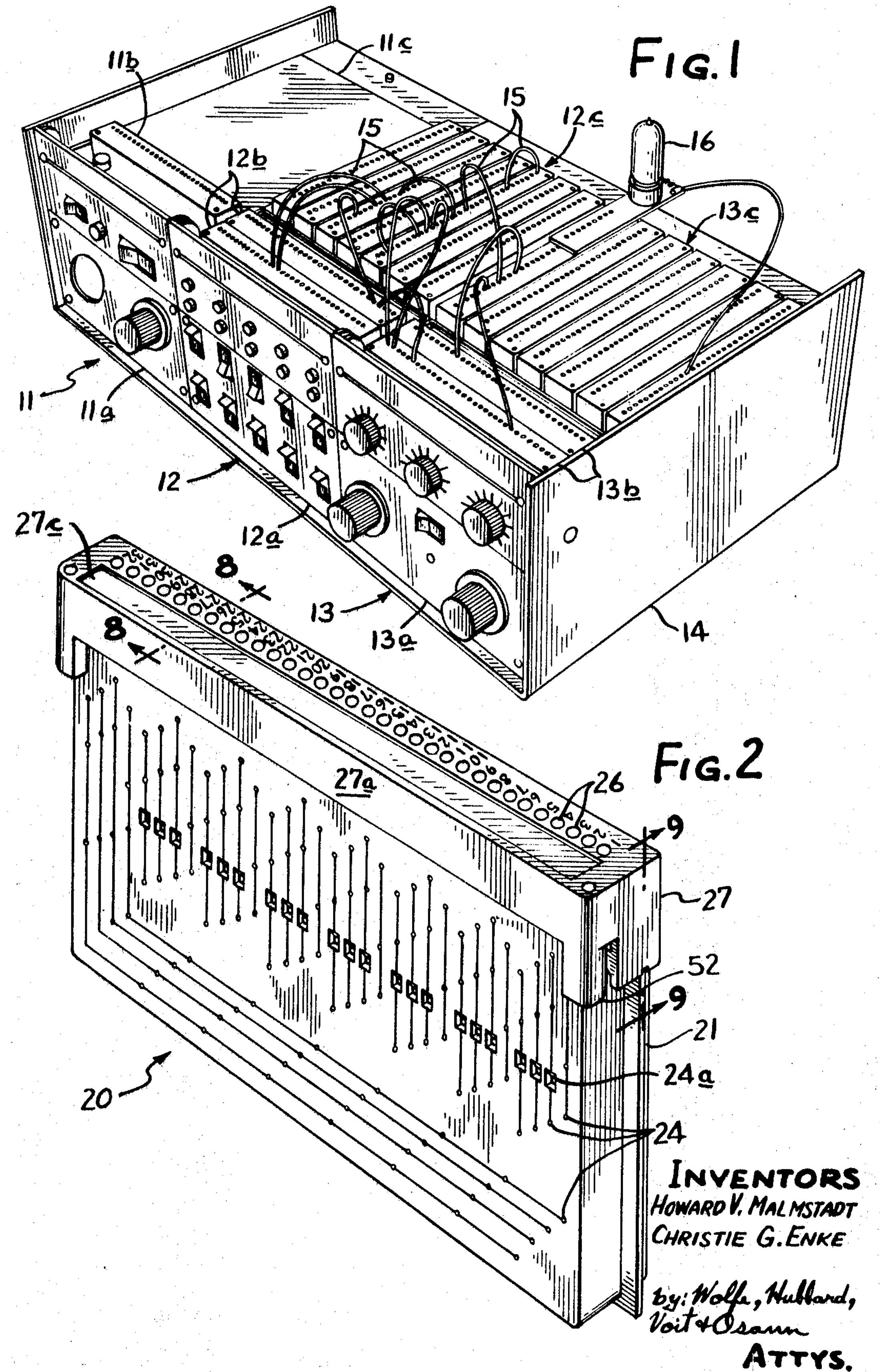
FIG. 1 is a perspective view of a modular electrical interconnection system embodying the present invention in an electronic educational device.
FIG. 2 is an enlarged perspective view of one of the modular units removed from the system of FIG. 1.

Turning now to the drawings and referring first to FIG. 1, there is shown an education device 10 designed for use in teaching electronics. The device comprises a plurality of chassis modules 11, 12, and 13, mounted within a supporting frame 14, and which may be interchanged with other chassis modules to provide a versatile instructional aid. Each chassis module basically comprises a front panel 11*a*, 12*a*, or 13*a* having a plurality of control and display elements mounted directly behind the panel and accessible on the front of the panel via appropriate apertures; one or more header sections 11*b*, 12*b*, 13*b* for making electrical connections to the control and display elements on the respective front panels; and a well portion directly behind the header sections for receiving a conventional power supply unit 11*c* in the case of module 11, or a plurality of modular interconnection units as indicated at 12*c* and 13*c* in the case of modules 12 and 13.

Since the control and display portions of the educational device 10 do not form a part of the present invention, they will not be described in detail herein. Suffice it to say that the instructor and trainees may interconnect the various control and display elements to a wide variety of different circuits and circuit components mounted in the wells 12*c*, 13*c* to produce a wide variety of different electronic systems. Educational devices of this type are especially useful in teaching digital logic, digital measurement techniques, digital instrumentation and the like, so that all training from basic logic to sophisticated digital instrument design can be accomplished with a single versatile system. The particular system illustrated is the Heath Modular Digital System–801, manufactured by the Heath Company, Benton Harbor, Mich.

In accordance with the present invention, there is provided an improved modular unit for making electrical connections with ordinary electrical wire without the use of special jacks, pins or the like, the modular unit comprising the combination of a card member having one or more circuit elements thereon, a multiplicity of receptacles mounted on the card member and electrically connected to preselected portions of the circuit elements, casing means mounted on the card and forming a multiplicity of apertures extending therethrough and associated with the entranceways of the receptacles for receiving and guiding electrical wires into the receptacles, and a multiplicity of electrical wires having stripped end portions inserted through the apertures into the receptacles for making selected electrical connections with the circuit elements on the card member. In the preferred embodiment of the invention, each of the receptacles forms an entranceway for receiving the stripped end portion of an ordinary electrical wire and includes at least one biasing element for engaging the stripped end portion of the wire inserted in the entranceway and biasing the same against a portion of the receptacle so as to frictionally retain the wire within the receptacle while making electrical contact therewith. The casing is also preferably provided with indicia associated with the wire-receiving apertures for indicating the relationship of the various receptacles associated with the apertures to the circuit elements on the card member and to each other.

Figure 4:
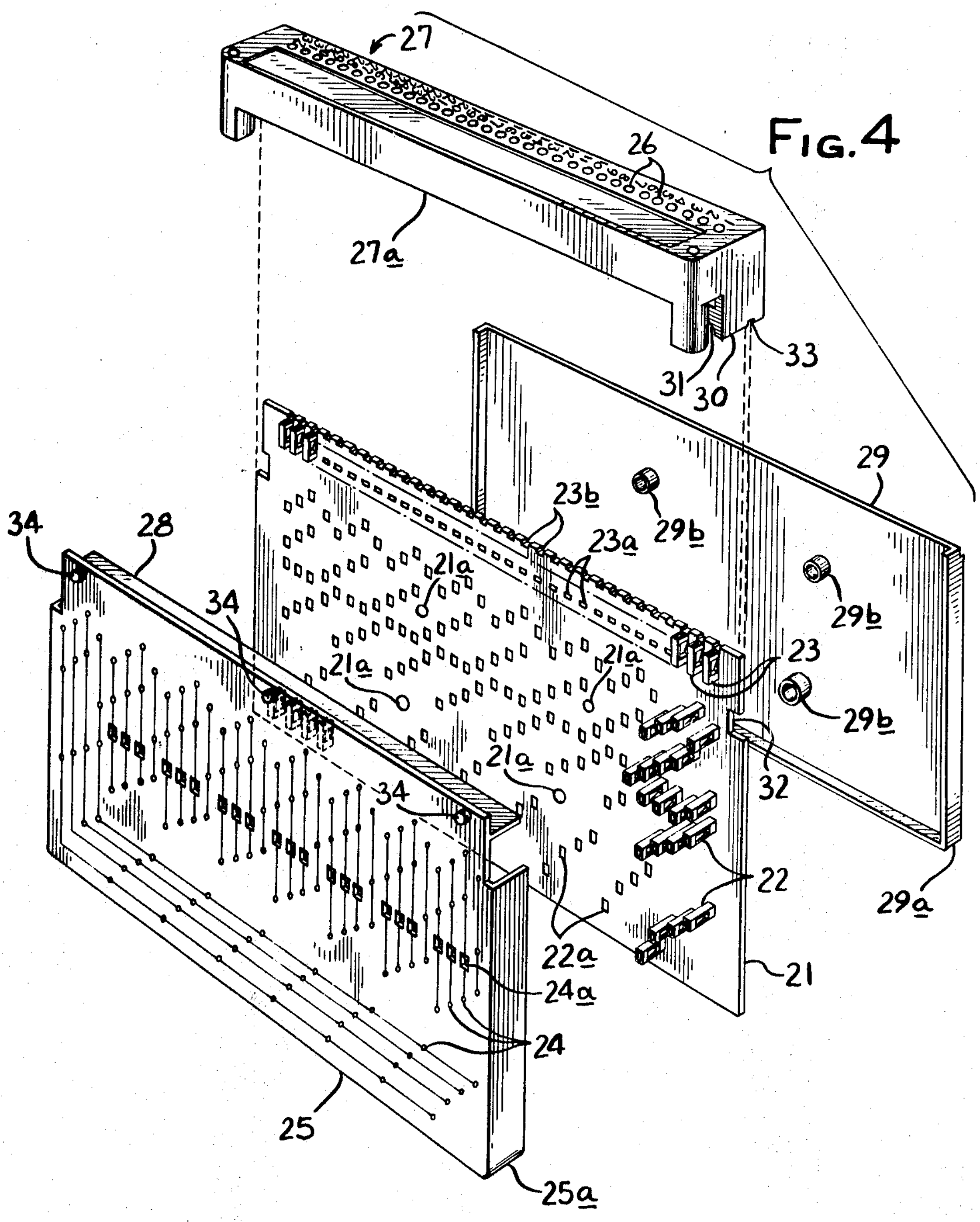
FIG. 4 is an exploded perspective view of the modular unit shown in FIG. 2.

Thus, referring particularly to FIGS. 2 and 4, an illustrative modular unit 20 adapted to fit into one of the wells 12*c*, 13*c* includes a central card member 21 having one or more circuit elements thereof. For example, a printed circuit may be formed on the rear side of the card 21 as viewed in FIG. 4 with or without one or more active or passive circuit components and/or integrated circuits. It will be understood that the term "circuit element" as used herein and in the appended claims includes conductors such as those provided by a printed circuit pattern, for example, as well as active and passive circuit components, integrated circuit modules and the like. The particular circuit arrangements provided on the card 21 do not form a part of the present invention, and may be virtually any desired circuit, such as various logic gates, bistable or monostable multivibrators, oscillators and the like. One of the advantages of the particular educational device illustrated is that the trainee may work with preconstructed circuits, or he may construct the circuits himself. When integrated circuit modules are utilized, relatively complex networks may be formed on a single card.

For the purpose of making electrical connections to the circuit elements on the illustrative card 21, two different arrays of receptacles 22 and 23 are mounted on the front side of the card 21 as viewed in FIG. 4. The receptacles 22 in the first array are oriented normal to the card surface for receiving electrical wires inserted through a corresponding array of apertures 24 in a front casing panel 25, while the receptacles 23 in the second array are oriented parallel to the card surface for receiving electrical wires inserted through apertures 26 in a header section 27 of the module casing. The particular receptacles 22, 23 shown in the illustrative embodiment are conventional per se, and are commercially available from AMP Incorporated, Harrisburg, Pa. under the trademark "Ampmodu."

While the particular mounting arrangement for each individual receptacle is not shown in the drawings, it will be understood by those familiar with this art that each receptacle is provided with a pair of mounting legs which project through complementary holes or notches in the card 21, and are bent flush with the card surface on the rear side thereof and secured to the card by soldering or the like. More particularly, the mounting legs for each receptacle 22 in the first array project through a complementary hole 22*a* in the card 21, and are bent away from each other flush with the card surface on the rear side thereof. In the case of the receptacles 23, one mounting leg projects through a complementary hole 23*a* in the card 21, the other leg projects through a similarly formed notch 23*b* in the top edge of the card, and the two legs are bent toward each other flush with the card surface on the rear side thereof. Each individual receptacle is in the general form of a rectangular shell, with opposed side walls thereof forming a pair of similar tangs which are bent inwardly toward each other so as to form a pair of biasing elements for frictionally engaging an electrical connector inserted through the open end of the receptacle.

One of the important advantages of the present invention is the extremely high density of electrical connections that can be achieved, with corresponding reductions in the overall size of the modular system. A few typical interconnections are illustrated by the wires 15 in FIG. 1, from which it can be seen that many more interconnections could be made with facility. The receptacles 22, 23 and the entrance apertures 24, 26 associated therewith can be closely spaced, since each one need accommodate only a single electrical wire without any special jacks, connector pins or the like. Similarly, the receptacles 22, 23 and the corresponding apertures 24, 26 may be arranged in any desired configuration, depending upon the particular function for which the card is designed, and one of the arrays of receptacles 22 or 23 may even be omitted. In the particular embodiment illustrated, adjacent receptacles are spaced by 0.156 inch, and the receptacles are arranged to simply provide a plurality of common connector lines represented by the lines interconnecting various groups of the apertures 24 on the front of the modular unit. The common receptacles in each group are interconnected by a printed circuit on the rear side of the card 21, and the mounting legs of each receptacle are soldered to the printed circuit, by wave soldering techniques for example. This type of card typically has no active circuit elements thereon. Most of the apertures 24 are dimensioned to receive only a single wire, to prevent damage to the receptacle by the insertion of two wires therein at the same time, but a few selected apertures 24*a* are enlarged and formed with a tapered rectangular configuration to accommodate connector jacks if desired. It will also be noted that the apertures 26 in the header sections 27 in the illustrative embodiment are considerably larger than the apertures 24 in the front panel 25. This increases the versatility of the unit by permitting electrical components, such as the tube 16 illustrated in FIG. 1, to be mounted on the top of the header section via conventional connector pins.

To protect the normally oriented receptacles 22, the front casing panel 25 includes an integral rearwardly projecting flange 25 extending along the bottom and both ends of the panel and adapted to abut the front surface of the card 21 adjacent the peripheral receptacles 22; this flange 25*a* prevents the panel 25 from being forced inwardly against the receptacles 22, and also encloses the entire array of receptacles 22 on three sides to further protect the receptacles against damage from mishandling.

In accordance with one particular aspect of this invention, the casing of the modular unit also includes stop means made of an electrically insulating material and located adjacent the inner ends of the parallel receptacles for engaging the ends of electrical wires inserted therein, thereby limiting the lengths of wire inserted in those receptacles and preventing electrical contact between the wires in adjacent receptacles even when they are closely spaced to one another. Thus, in the illustrative embodiment, the front casing panel 25 includes an integral stop member 28 projecting from the rear surface thereof and extending along the inner ends of the entire array of parallel receptacles 23. Consequently, when an electrical wire is inserted through one of the holes 26 into one of the receptacles 23, the end of the wire will abut the stop member 28 so as to limit the length of wire that can be inserted in the receptacle, and thereby prevent electrical contact between the wires in adjacent receptacles even with the close receptacle spacing illustrated. The casing panel 25 is typically made of molded plastic, so that the stop member 28 will be inherently non-conductive, but the upper surface of the stop member 28 could be coated with a non-conductive material in the event that the panel 25 were made of a conductive material such as stamped metal or the like.

Figure 5:
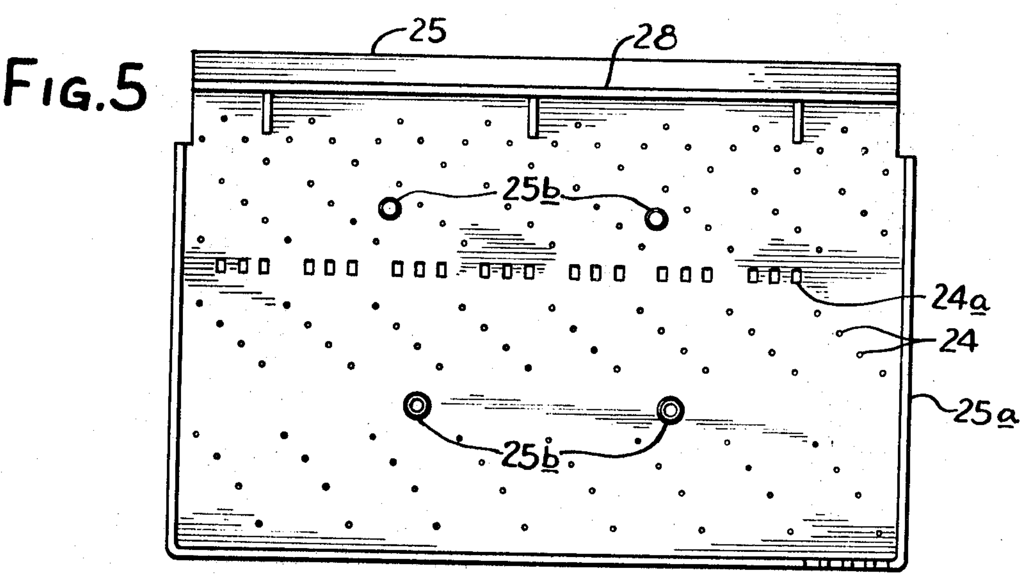
FIG. 5 is an elevation view of the inside surface of the front panel of the casing of the modular unit shown in FIG. 2.
Figure 6:
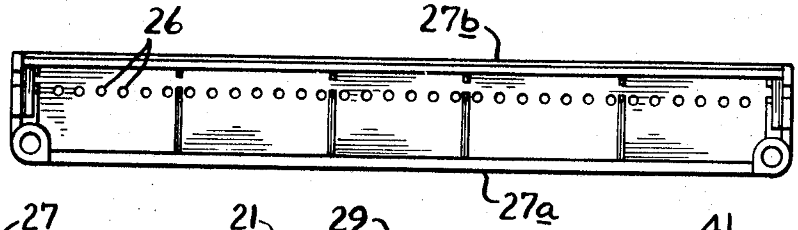
FIG. 6 is a bottom plan view of the header section of the casing of the modular unit shown in FIG. 2.
Figure 7:
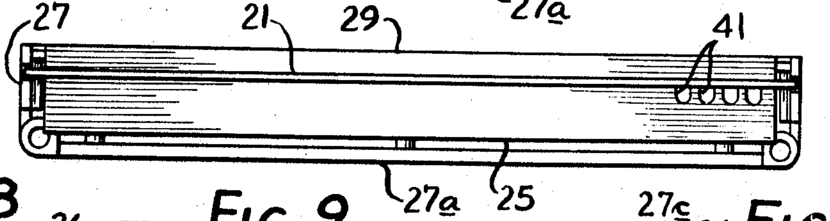
FIG. 7 is a bottom plan view of the modular unit shown in FIG. 2.

In keeping with the present invention, the casing of the modular unit is also designed to provide a stop means for electrical wires inserted into the normally oriented receptacles 22. Thus, in the illustrative embodiment, a rear casing panel 29 is provided with an integral forwardly projecting flange 29*a* extending along the bottom and both ends of the panel and adapted to abut the rear side of the card 21 directly opposite the flange 25*a* on the front side of the card. The flange 29a spaces the main body portion of the panel 29 slightly away from the rear surface of the card 29 to accommodate the electrical circuit elements mounted on the card and electrically connected to the receptacles 22 and 23. When an electrical wire is inserted through one of the holes 24 into one of the receptacles 23, the end of the wire abuts the main body portion of the rear panel 29 so as to limit the length of wire that can be inserted into each receptacle, thereby preventing electrical contact between the wires in adjacent receptacles even with the relatively high receptacle density illustrated. The rear panel 29 also cooperates with the front panel 25 to insure precise register of the holes 24 in the panel 25 with the open forward ends of the receptacles 22 mounted on the card 21. More particularly, the rear panel 29 includes a plurality of spaced integral sockets **29*b* adapted to receive a plurality of complementary posts 25*b* formed as integral parts of the front panel 25 (see FIGS. 5 and 8). As the two panels 25 and 29 are fitted against opposite sides of the card 21, the posts 25*b* project through corresponding holes 21*a* (FIGS. 4 and 8) in the card member 21, and into the sockets 29*b*. In the particular embodiment illustrated, the two top sockets 29*b* are closed at their outer ends and the corresponding posts 25*b* are solid so that they serve merely as positive registration means. The two lower sockets 29*b*, on the other hand, are open at their outer ends and the corresponding posts 25*b* are hollow so as to receive threaded fasteners through the open outer ends of the sockets 29*b*; consequently, the lower posts and sockets serve not only as positive registration means, but also to fasten the two panels 25, 29 and the card member 21** rigidly together.

Figures 8, 9, 10:
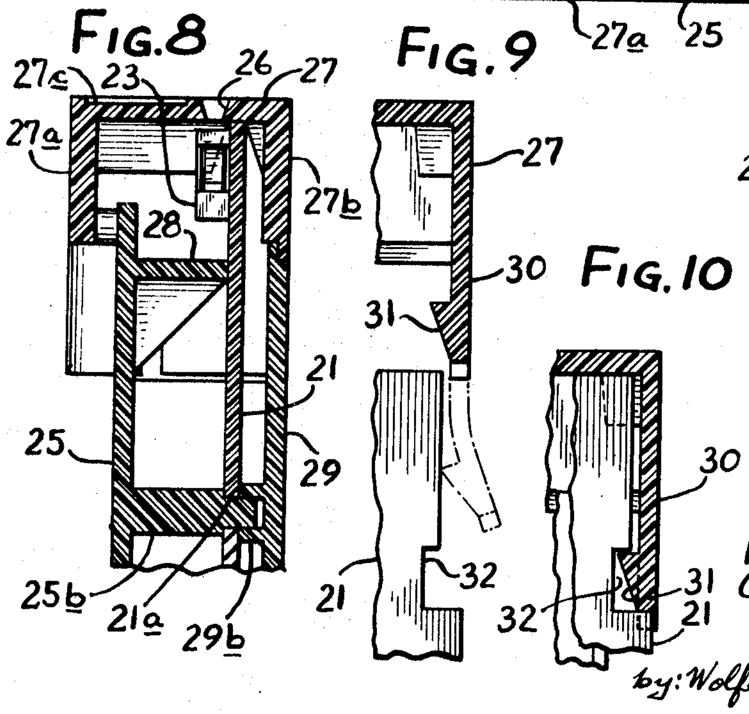
FIG 8 is an enlarged fragmentary section taken along lines 8—8 in FIG. 2.
FIG. 9 is an enlarged fragmentary section taken along line 9—9 in FIG. 2, but with the header section of the casing removed from the modular unit.
FIG. 10 is an enlarged fragmentary section taken along line 9—9 in FIG. 2 with the header section in its assembled position.

As another feature of the invention, the header section 27 of the casing is adapted to snap over the side edges of the card member 21 to provide an integral mounting arrangement. More particularly, the opposite ends of the header section 27 include a pair of depending legs 30 having integral mounting lugs 31 on the inner surfaces thereof for snapping into a pair of complementary notches 32 in the side edges of the card 21. Referring particularly to FIGS. 9 and 10, it can be seen that as the header section 27 is pushed downwardly over the indented upper portions of the end edges of the card 21, the depending legs 30 are deflected outwardly due to the camming action of the sloping bottom surfaces of the lugs 31. When the upper ends of the lugs 31 reach the upper edges of the notches 32, the lugs 31 snap into the notches to lock the header in place, returning the depending legs 30 to their normal undeflected positions. To prevent lateral movement of the header section 27, a small notch 33 is formed in the bottom edge of each leg 30 to fit over the card 21 at the lower edge of the notch 32.

To further protect the receptacles 22 and 23 from damage due to mishandling and the like, the front and rear walls **27*a* and 27*b*, respectively, of the header 27 extend downwardly into slight overlapping relationship with the front panel 25 and rear panel 29, respectively. Furthermore, to provide space for interconnecting wires between different apertures 24 on the front side of the panel 25, the front wall 27*a* of the header is designed to be spaced slightly away from the front surface of the panel 25, and this space is maintained by a plurality of spacer elements 34 molded as integral parts of the panel 25 and positioned to bear against the inner surface of the wall 27*a*. Thus, when two or more modular units are placed side by side closely adjacent each other, as illustrated in FIG. 1 for example, the front surface of each panel 25 will be spaced from the adjacent rear panel 29 by a space equal to the thickness of the front wall 27*a* of the header section 27 plus the thickness of the spacer elements 34, thereby providing a gap between the adjacent panel surfaces sufficient to accommodate interconnecting wires between the apertures 24 on the front of the panel 25**.

To facilitate correlation of the various receptacles 23 with the particular portions of the circuit with which they are operatively associated, appropriate indicia are preferably provided on the top surface of the header 27 adjacent the apertures 26. In the particular embodiment illustrated, index numerals 1 through 32 are molded as a part of the header section 27 to identify the 32 apertures 26 and, in addition, a shallow recess **27*c* is molded into the header section to provide an area for the application of an indicia-bearing label. The label may, for example, graphically illustrate the specific electrical connections of the various receptacles associated with the respective apertures 26, as illustrated for the header sections of units 12*b* and 13*b*** in FIG. 1.

For the purpose of supplying power to the circuit elements mounted on the card 21, a separate series of parallel receptacles 40 (FIG. 4) may be mounted near the bottom edge of the card 21 for cooperation with a corresponding series of apertures 41 formed in the bottom flange of the front panel 25. Then when the modular unit 20 is fitted within one of the wells **12*c* or 13*c*, a corresponding series of upstanding jacks or pins 42 automatically enter the apertures 41 and receptacles 40 to connect the card to the main power supply, as well as the control and display elements mounted behind the front panels 12 and 13. By providing receptacles for only selected ones of the four pins 42**, different power inputs may be automatically provided for different circuit arrangements in the modular units.

Figure 3:
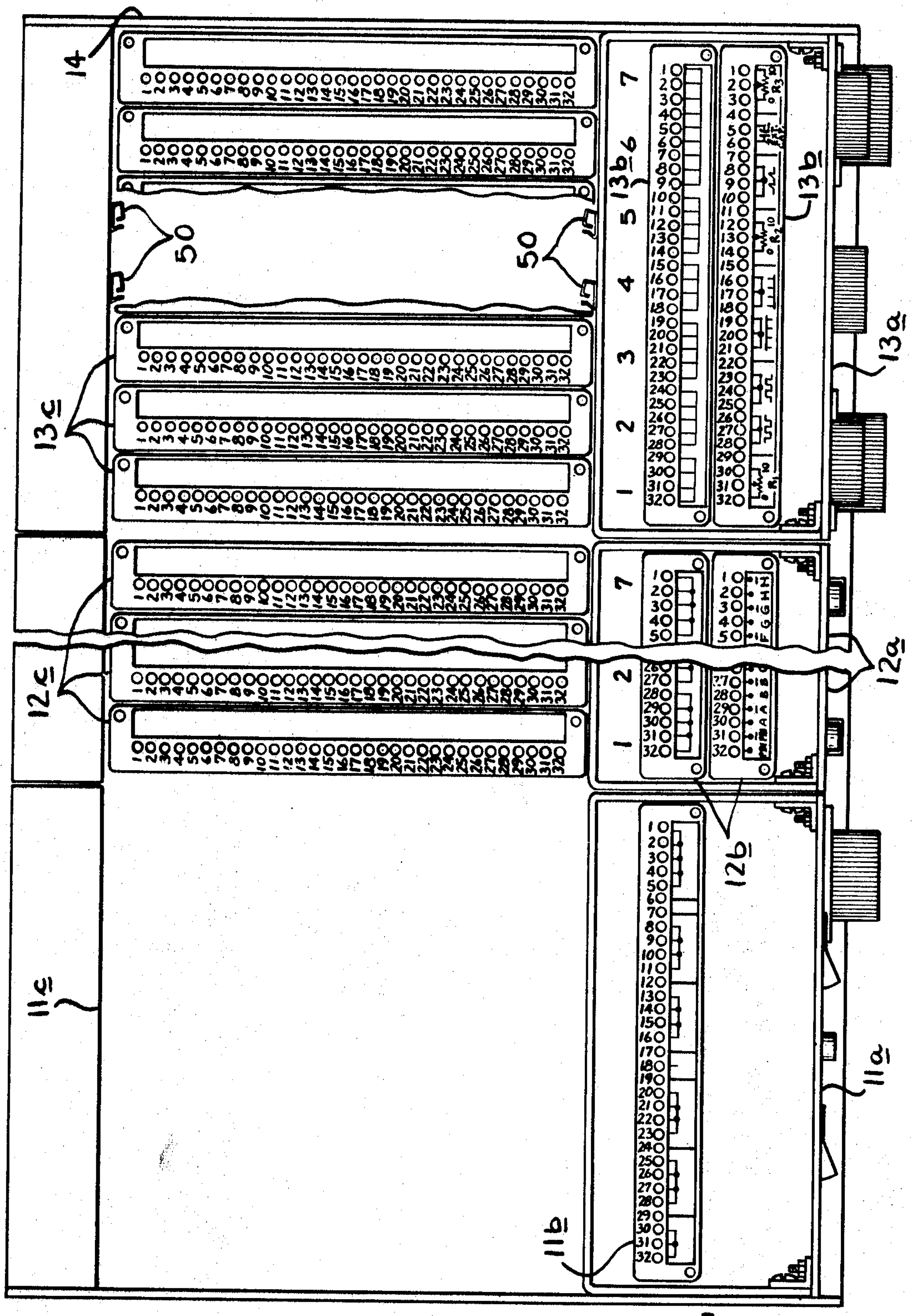
FIG. 3 is an enlarged top plan view of the system shown in FIG. 1 with the connecting wires and other fragments thereof removed for clarity.

In accordance with still another aspect of this invention, the end portions of the casing and card members cooperate with each other to form guiding and support elements for use with complementally formed tracks on the walls of the chassis wells **12*c* and 13*c*. Thus, as can be seen in FIG. 2, the end portions of the card member 21 project beyond the end flanges of the panels 25 and 29 to form a generally T-shaped structure which cooperates with complementary vertically oriented tracks 50 (see FIG. 3) on the front and rear walls of the wells 12*c* and 13*c*. More particularly, the protruding end portions of the card 21 fit into the slats 50*a* of the tracks 50, while the end walls of the panels 25 and 29 ride over the outside surfaces of the track members 50, thereby providing a smooth, stable guiding and support arrangement without the addition of any supplemental elements on the modular unit 20**.

In addition to the track arrangement, the header section 27 in the illustrative embodiment includes a pair of depending socket members 52 at opposite ends thereof for receiving complementary locating posts (not shown) as an alternative mounting arrangement. The hole in the center of the socket extends all the way through the header section 27, as shown in FIGS. 2 and 4, so that the locating posts can be inserted from either the top or bottom.

Figure 11:
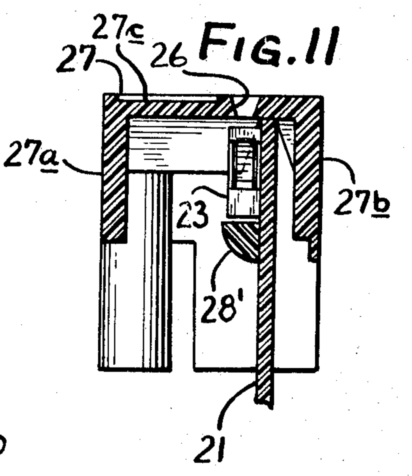
FIG. 11 is an enlarged fragmentary section similar to FIG. 8, but showing a modified construction of a portion of the modular unit shown in FIG. 2.

In certain instances, it may be desired to use the modular unit described above with a card 21 having only the parallel receptacles 23, and only the header section 27 of the casing, as illustrated in FIG. 11. In this case, a stop member 28′ is mounted on the card 21, suitably in the form of an elongated insulating strip made of rubber or plastic, for example, and extending continuously along the lower ends of the receptacles 23. It will be appreciated that the omission of the front and rear panels 25 and 29 does not affect the mounting of the header section 27, since it is mounted on the card 21 and includes the card registration notch 33 for positioning and stabilizing the header section 27 relative to the card 21 in the lateral direction. The modified structure of FIG. 11 may be used, for example, as the header sections **11*b*, 12*b*, and 13*b* shown in FIG. 1, with the depending card 21 extending downwardly behind the respective front panels 11, 12 and 13** to provide connection means to the control and display elements mounted on the corresponding front panels.

As can be seen from the foregoing detailed description, this invention provides an improved modular unit for making patch-type electrical connections by the use of ordinary electrical hook-up wire, without the use of any special jacks, connector pins, posts or the like. This leads to significant cost reductions in both the material and labor required to produce such units. Furthermore, the unique structure of the modular units permits an extremely high density of electrical connections, with corresponding reductions in the overall size of the modular system. The versatility of the modular connection units makes them ideally suited for use in educational devices, since they can be used with virtually any type of circuit arrangement desired, including printed circuits, discrete active and passive components, integrated circuits, and the like.

We claim as our invention:

1. A modular unit for making plug-in electrical connections with ordinary electrical wire without the use of special jacks, pins or the like, said modular unit comprising the combination of a card member having one or more electrical circuit elements thereon, a multiplicity of receptacles mounted on said card member and electrically connected to preselected portions of said circuit elements, each of said receptacles forming an entranceway for receiving an electrical wire and including at least one biasing element for engaging an electrical wire inserted in said entranceway and biasing the same against a portion of the receptacles so as to frictionally retain the wire within the receptacle while making electrical contact therewith, said receptacles being oriented with the entranceways substantially normal to the card surface, casing means including a first casing section mounted on one side of said card member and forming apertures aligned with said entranceways for receiving and guiding electrical wires into said receptacles, and a second casing section mounted on the other side of said card for limiting the lengths of wire inserted into said receptacles, said first casing section having indicia associated with said apertures for indicating the relationship of the various receptacles associated with said apertures to the circuit elements on said card member.

2. A modular unit of the type including a card member having one or more circuit elements mounted thereon and providing for electrical connection between said circuit elements and sources external to said modular unit, comprising:

a multiplicity of receptacles mounted on said card member and electrically connected to preselected portions of said circuit elements, each of said receptacles forming an entranceway for receiving an electrical wire and including means for engaging and biasing a received wire against a portion of said receptacle so as to frictionally retain the wire within said receptacles while making electrical connection therewith;

casing means mounted on said card and extending over at least the entranceways of said receptacles, said casing means forming a multiplicity of apertures extending therethrough and associated with the entranceways of said receptacles for receiving and guiding electrical wires into said receptacles; and electrically non-conductive stop means mounted on said card member in a position to limit the length of electrical wires received within said receptacles by engagement with end portions of said received wires which may project through said receptacles.

3. A modular unit for making electrical connections with ordinary electrical wire without the use of special jacks, pins or the like, said modular unit comprising the combination of a card member having one or more circuit elements thereon, a multiplicity of receptacles mounted on said card member and electrically connected to preselected portions of said circuit elements, each of said receptacles forming an entranceway for receiving an ordinary electrical wire and including at least one biasing element for engaging a stripped end portion of the wire inserted in said entranceway and biasing the same against a portion of said receptacle so as to frictionally retain the wire within the receptacle while making electrical contact therewith, casing means mounted on said card and extending over at least the entranceways of said receptacles, said casing means forming a multiplicity of apertures extending therethrough and associated with the entranceways of said receptacles for receiving and guiding electrical wires into said receptacles, and a multiplicity of electrical wires having stripped end portions inserted through said apertures into said receptacles for making electrical connections with said circuit elements on said card member, and wherein said receptacles are mounted on said card member with said entranceways oriented substantially parallel to the card surface, and including stop means made of an electrically insulating material and mounted on said card member adjacent the rear ends of said receptacles for engaging the ends of electrical wires inserted therein and thereby limiting the length of wire inserted in said receptacles.

4. A modular unit for making electrical connections with ordinary electrical wire without the use of special jacks, pins or the like, said modular unit comprising the combination of a card member having one or more circuit elements thereon, a multiplicity of receptacles mounted on said card member and electrically connected to preselected portions of said circuit elements, each of said receptacles forming an entranceway for receiving an ordinary electrical wire and including at least one biasing element for engaging a stripped end portion of the wire inserted in said entranceway and biasing the same against a portion of said receptacle so as to frictionally retain the wire within the receptacle while making electrical contact therewith, casing means mounted on said card and extending over at least the entranceways of said receptacles, said casing means forming a multiplicity of apertures extending therethrough and associated with the entranceways of said receptacles for receiving and guiding electrical wires into said receptacles, and a multiplicity of electrical wires having stripped end portions inserted through said apertures into said receptacles for making electrical connections with said circuit elements on said card member, and wherein said receptacles are mounted on said card member with said entranceways oriented substantially parallel to the card surface, and including a single elongated stop means made of an electrically insulating material and mounted on said card member adjacent the rear ends of a multiplicity of said receptacles for engaging the ends of electrical wires inserted therein and thereby limiting the length of wire inserted in said receptacles and limiting the movement of the wire ends so as to prevent electrical contact between the wires in adjacent receptacles even when the receptacles are closely spaced to one another.

5. A modular unit for making plug-in electrical connections with ordinary electrical wire without the use of special jacks, pins, or the like, said modular unit comprising the combination of a card member having one or more circuit elements thereon, a multiplicity of receptacles mounted on said card member in a row along one edge of said card member with the entranceways of the receptacles oriented substantially parallel to the card surface, said receptacles being electrically connected to preselected portions of said circuit elements, each of said receptacles forming an entranceway for receiving an electrical wire and including at least one biasing element for engaging a stripped end portion of an electrical wire inserted in said entranceway and biasing the same against a portion of the receptacle so as to frictionally retain the wire within the receptacle while making electrical contact therewith, casing means including a header member adapted to snap over said edge of said card member and forming a multiplicity of apertures aligned with said receptacles for receiving and guiding electrical wires into said receptacles along said edge of the card member, said header member having indicia adjacent said apertures for indicating the relationship of the various receptacles to the circuit elements on the card member, and a multiplicity of electrical wires inserted through said apertures into said receptacles for making electrical connections with said circuit elements on said card member, the ends of said header member forming a pair of resilient mounting lugs adapted to extend downwardly over portions of the ends of said card member and snap into notches formed in the ends of said card member.

6. A modular unit for making plug-in electrical connections with ordinary electrical wire without the use of special jacks, pins, or the like, said modular unit comprising the combination of a card member having one or more circuit elements thereon, a multiplicity of receptacles mounted on said card member in a row along one edge of said card member with the entranceways of the receptacles oriented substantially parallel to the card surface, said receptacles being electrically connected to preselected portions of said circuit elements, each of said receptacles forming an entranceway for receiving an electrical wire and including at least one biasing element for engaging a stripped end portion of an electrical wire inserted in said entranceway and biasing the same against a portion of the receptacle so as to frictionally retain the wire within the receptacle while making electrical contact therewith, casing means including a header member adapted to snap over said edge of said card member and forming a multiplicity of apertures aligned with said receptacles for receiving and guiding electrical wires into said receptacles along said edge of the card member, said header member having indicia adjacent said apertures for indicating the relationship of the various receptacles to the circuit elements on the card member, a multiplicity of electrical wires inserted through said apertures into said receptacles for making electrical connections with said circuit elements on said card member, and stop means made of an electrically insulating material and mounted on said card member, said stop means being positioned adjacent the inner ends of said receptacles for engaging the ends of electrical wires inserted therein and thereby limiting the length of wire inserted in said receptacles.

7. A modular unit for making plug-in electrical connections with ordinary electrical wire without the use of special jacks, pins, or the like, said modular unit comprising the combination of a card member having one or more circuit elements thereon, a multiplicity of receptacles mounted on said card member in a row along one edge of said card member with the entranceways of the receptacles oriented substantially parallel to the card surface, said receptacles being electrically connected to preselected portions of said circuit elements, each of said receptacles forming an entranceway for receiving an electrical wire and including at least one biasing element for engaging a stripped end portion of an electrical wire inserted in said entranceway and biasing the same against a portion of the receptacle so as to frictionally retain the wire within the receptacle while making electrical contact therewith, casing means including a header member adapted to snap over said edge of said card member and forming a multiplicity of apertures aligned with said receptacles for receiving and guiding electrical wires into said receptacles along said edge of the card member, said header member having indicia adjacent said apertures for indicating the relationship of the various receptacles to the circuit elements on the card member, a multiplicity of electrical wires inserted through said apertures into said receptacles for making electrical connections with said circuit elements on said card member, and a single elongated stop means made of an electrically insulating material and mounted on said card member substantially parallel to said header member adjacent the inner ends of a multiplicity of said receptacles for engaging the ends of electrical wires inserted therein and thereby limiting the length of wire inserted in said receptacles and also limiting the movement of the wire ends so as to prevent electrical contact between the wires in adjacent receptacles even when the receptacles are closely spaced to one another.

8. A modular unit for making plug-in electrical connections with ordinary electrical wire without the use of special jacks, pins, or the like, said modular unit comprising the combination of a card member having one or more circuit elements thereon, a multiplicity of receptacles mounted on said card member and electrically connected to preselected portions of said circuit elements, a first group of said receptacles being mounted along at least one edge of said card member with the entranceways oriented substantially parallel to the card surface, and a second group of said receptacles being mounted with the entranceways oriented substantially normal to the card surface, each of said receptacles forming an entranceway for receiving an electrical wire and including at least one biasing element for engaging an electrical wire inserted in said entranceway and biasing the same against a portion of the receptacle so as to frictionally retain the wire within the receptacle while making electrical contact therewith, casing means mounted on said card member and extending over at least the entranceways of said receptacles, said casing means forming a multiplicity of apertures extending therethrough and associated with the entranceways of said receptacles for receiving and guiding electrical wires into said receptacles, said casing means having indicia associated with said apertures for indicating the relationship of the various receptacles associated with said apertures to the circuit elements on said card member, and a multiplicity of electrical wires inserted through said apertures into said receptacles for making electrical connections with said circuit elements on said card member, and wherein said casing means comprises a header member adapted to snap over the edge of the card member on which said first group of receptacles are mounted and forming apertures aligned with the entranceways of said receptacles for receiving and guiding electrical wires into said receptacles, a first side casing section mounted on one side of said card member and forming apertures aligned with the entranceways of said second group of receptacles for receiving and guiding electrical wires into said receptacles, said first side casing section including an integral stop member extending along the rear ends of said first group of receptacles for limiting the length of wire inserted into said first group of receptacles, and a second side casing section mounted on the other side of said card member for limiting the lengths of wire inserted into the receptacles in said second group.

References Cited

UNITED STATES PATENTS

| | | | |
|---|---|---|---|
| 2,946,036 | 7/1960 | Bettencourt. | |
| 3,177,404 | 4/1965 | Patmore | 317—99 |
| 3,200,361 | 8/1965 | Schwartz et al. | |
| 3,270,251 | 8/1966 | Evans. | |
| 3,383,653 | 5/1968 | Bolton et al. | 317—101 X |
| 3,413,594 | 11/1968 | Fernald et al. | |

ROBERT K. SCHAEFER, Primary Examiner

D. SMITH, Jr., Assistant Examiner

U.S. Cl. X.R.

35—19.1; 339—17